(12) United States Patent
McKenzie

(10) Patent No.: US 9,755,688 B1
(45) Date of Patent: Sep. 5, 2017

(54) MEMEX CELL PHONE CASE SYSTEMS

(71) Applicant: Michael McKenzie, Georgetown, TX (US)

(72) Inventor: Michael McKenzie, Georgetown, TX (US)

( * ) Notice: Subject to any disclaimer, the term of this patent is extended or adjusted under 35 U.S.C. 154(b) by 0 days.

(21) Appl. No.: 15/256,096

(22) Filed: Sep. 2, 2016

(51) Int. Cl.
*H04B 1/3888* (2015.01)
*A45C 11/00* (2006.01)
*A45F 5/00* (2006.01)

(52) U.S. Cl.
CPC ............ *H04B 1/3888* (2013.01); *A45C 11/00* (2013.01); *A45F 5/00* (2013.01); *A45C 2011/002* (2013.01); *A45C 2200/15* (2013.01)

(58) Field of Classification Search
CPC . H04B 1/3888; A45C 11/00; A45C 2011/002; A45C 2200/15; A45F 5/00
USPC ............. 455/575.1, 575.8, 90.3; 379/428.01, 379/433.01, 437
See application file for complete search history.

(56) References Cited

U.S. PATENT DOCUMENTS

| 2012/0327580 A1 | 12/2012 | Gengler |
| 2013/0106353 A1 | 5/2013 | Foster |
| 2014/0187289 A1 | 7/2014 | Cataldo et al. |

*Primary Examiner* — Raymond Dean
(74) *Attorney, Agent, or Firm* — Integrity Patent Group, PLC; Edwin Wold

(57) ABSTRACT

A MemEx Cell Phone Case for providing a combination of accessory functions in conjunction with a protective mobile device case, including a storable touchscreen stylus, a foldable, magnetically retained kickstand, an external memory expansion adapter, and openings for charging ports. The memory adapter permits consumers to increase the memory of their smart phone or other device which may be otherwise incapable or receiving a memory upgrade. The adapter includes a receptacle for commercially available memory storage devices such as a micro-SD card, and features a dust cover. The entire assembly is secured by a detachable phone retainer to ensure a positive connection between the phone and case functions. The MemEx case is designed to accommodate all the controls and functions of various mobile devices in a durable, utilitarian case while providing these additional accessories.

19 Claims, 4 Drawing Sheets

MEMEX CELL PHONE CASE SYSTEMS

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of mobile device cases and more specifically relates to a mobile device with auxiliary functions.

RELATED ART

A mobile device is a small, lightweight computing device, typically small enough to be handheld, having a display screen with touch input or a miniature keyboard. A handheld computing device has an operating system (OS), and can run various types of application software, known as apps. Most handheld devices can also be equipped with Wi-Fi, Bluetooth, NFC, and GPS capabilities that can allow connections to the Internet and other devices, such as an automobile or a microphone headset, or can be used to provide Location-based services. A camera or media player feature for video or music files can also be typically found on these devices along with a stable battery power source such as a lithium battery. Increasingly, mobile devices also contain sensors like accelerometers, compasses, magnetometers, or gyroscopes, allowing detection of orientation and motion. Mobile devices may provide biometric user authentication, such as using a built-in camera for face recognition or using a fingerprint sensor for fingerprint recognition.

Because modern mobile devices contain expensive hardware that provides a wide variety of functions, it has become increasingly popular to equip them with protective casings. Mobile device cases may help make a device more resistant to potential damage encountered in everyday use. Cases may also add an aspect of fashion or individuality to a user's device.

Most modern mobile devices, unlike personal computers, do not offer convenient solutions for increasing computer memory. This is difficult due to the compact and inaccessible nature of mobile device hardware. A lack of storage can be inconvenient for the consumer, who may need additional memory for application programs, music files, photographs and videos, or other memory-consuming needs. Unfortunately, most mobile devices are too small to incorporate aftermarket memory banks, and commercially available accessory cases do not offer storage options. A suitable solution is desired.

Several attempts have been made to solve the above-mentioned problems such as those found in U.S. Pat. App. Pub. No. 2013/0106353 to David A. Foster, U.S. Pat. App. Pub. No. 2014/0187289 to John Cataldo et al, and U.S. Pat. App. Pub. No. 2012/0327580 to David P. Gengler. These references are representative of mobile device cases. However, none of the above references, taken either singly or in combination, is seen to describe the invention as claimed.

SUMMARY OF THE INVENTION

In view of the foregoing disadvantages inherent in the known mobile device case art, the present invention provides a novel cell phone case with external memory storage. The general purpose of the present invention, which will be described subsequently in greater detail is to provide a MemEx Cell Phone Case.

A MemEx Cell Phone Case system is disclosed in a preferred embodiment comprising a MemEx Cell Phone Case assembly. The MemEx Cell Phone Case system comprises a case shell (including a backside cover panel having an inside face and an outside face, a case skirt having an inside surface and an outside surface, a detachable phone retainer, a kickstand receiving slot, at least two hinge pins, at least two flexible button covers, and a plurality of apertures), a stylus (including a cylindrical body, a proximal end having a pointed tip, and a distal end), a kickstand (including a surface support, a stylus well, an upper supporting member, a lower supporting member, an upper hinge knuckle, and a lower hinge knuckle), and a memory expansion adapter (including a mobile device accepting terminal and an external memory accepting terminal).

The case shell, stylus, kickstand, and memory expansion adapter are in functional combination. The kickstand is hingedly attached and extendable from the case shell, being retained by a magnet, and the memory expansion adapter is permanently contained within the case shell, which is designed to enclose a mobile device. The MemEx Cell Phone Case system is designed to interchangeably accept and retain an external memory device within the memory expansion adapter. The memory expansion adapter is structured to communicate with internal memory of a mobile device.

The inside face of the backside cover panel of the case shell, the inner face of the case skirt of the case shell, and the retention lip of the case shell in functional combination form an inner volume shaped to hold a mobile device. The openings in the case shell are designed to allow access to various controls and functions of the mobile device, and flexible button covers are incorporated to allow protective access to various controls of the mobile device. The stylus is attached to the stylus well of the kickstand for storage. The kickstand contains the upper hinge knuckle and the lower hinge knuckle, which are hingedly attached to the two hinge pins of the case shell within the kickstand receiving slot. The kickstand is storable within the kickstand receiving slot of the case shell.

The openings in the case shell are adapted to receive an external memory device, which connects with the external memory expansion adapter. The mobile device accepting terminal of the external memory expansion adapter and the external memory accepting terminal of the external memory expansion adapter are molded into the backside cover panel of the case shell. The external memory expansion adapter is usable by the mobile device through the communication of electronic circuitry for storing electronic data when an external memory device is attached. The case shell is constructed of plastic and rubber, and is constructed to allow normal signal transmission of said mobile device.

The kickstand is hinged on the backside cover panel of the case shell in alignment with the kickstand receiving slot of the case shell so that the kickstand lies flush with the backside cover panel of the case shell when not in use, secured by magnetic inserts.

The surface support of the kickstand and the outside surface of the case skirt of the case shell form a resting face upon which the mobile device is supported when the kickstand is deployed. In an alternative embodiment, the kickstand may comprise a trapezoidal shape which allows better placement in both a "landscape" or "portrait" orientation.

The stylus is designed to interface with the touch screens of mobile devices. The mobile device is chargeable through the case shell, particularly via USB-type charging terminals.

The outside surface of the case skirt of the case shell, the outside face of the backside cover panel of the case shell, and the detachable phone retainer of the case shell form a rectangular protective outer membrane enclosing the mobile device in order to prevent damage to it.

The MemEx Cell Phone Case system may be adapted as a kit, including the case shell, the stylus, the kickstand, the external memory adapter, and a set of user instructions.

A preferred method of using the MemEx Cell Phone Case system includes pressing the mobile device into the retention lip of the case shell against the backside cover panel of the case shell, uncoupling the stylus from the stylus well of the kickstand, deploying the kickstand from the kickstand receiving slot of the case shell, resting the mobile device on the surface support of the kickstand; and using the stylus to interface with the mobile device.

The present invention holds significant improvements and serves as a cell phone case with external memory storage. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present disclosure, which may be constructed and operative according to the teachings of the present invention.

The various embodiments of the present invention will hereinafter be described in conjunction with the appended drawings, wherein like designations denote like elements.

DETAILED DESCRIPTION

Figure 1:
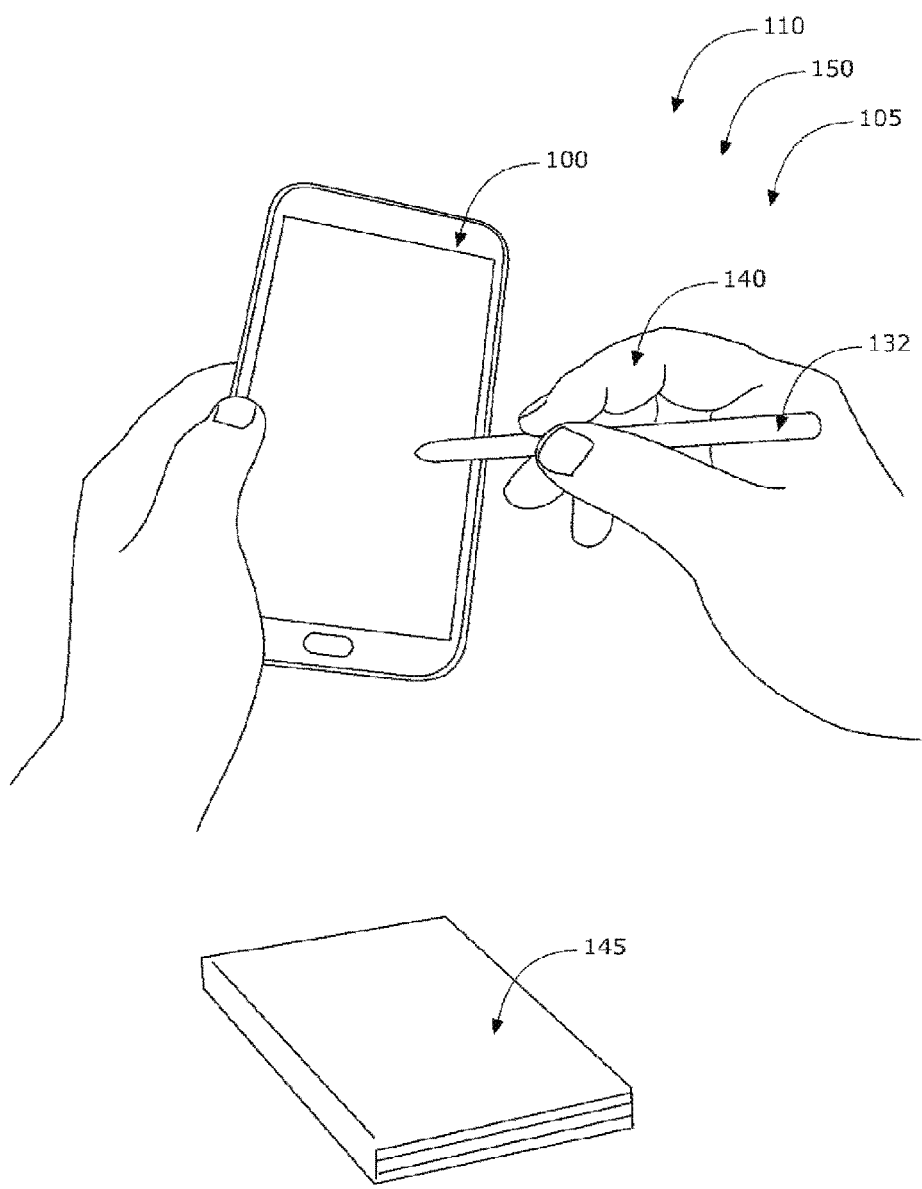
FIG. 1 shows a perspective view illustrating a MemEx Cell Phone Case system during an 'in-use' condition, according to an embodiment of the present disclosure.

As discussed above, embodiments of the present disclosure relate to a mobile device case and more particularly to a MemEx Cell Phone Case system as used to improve the cell accessory. Preferably, a mobile device case should provide options for external memory storage as well as other physical accessory functions and yet would operate reliably and be manufactured at a modest expense. Thus, a need exists for a reliable MemEx Cell Phone Case system to avoid the above-mentioned problems.

Generally speaking, MemEx Cell Phone Case systems may comprise a case for mobile devices, especially a smart phone, with a combination of desirable features. The preferred embodiment of the disclosure includes a protective case which includes a kickstand for resting the device on a surface, a stylus for operating a touch screen, a storage slot for retaining the stylus, and a receptacle for inserting a memory card, preferably of the micro-SD type, to interface and add supplementary data storage to the mobile device, and a dust cover for the micro-SD slot. The case also incorporates desirable aspects for protecting the device. The case is constructed of layered plastic and rubber, providing both a rigid, durable component and a shockproof, waterproof component to the case. The case incorporates appropriate openings and button covers allowing the case to provide ample protection for the device while providing full access to all the device's controls and facilities. These may include power buttons, volume rocker switches, speakers, microphones, cameras, antennas, charging ports, and other components.

The combination of the kickstand, stylus, stylus slot, and memory expansion adapter, incorporated into a durable protective case offers particular benefits. The combination of these features provide a case accessory that provides maximum utility. The memory expansion adapter meets a demand for adding aftermarket storage to commercial smartphones, which generally do not permit for expansion or replacement of internal memory.

The case comprises an enclosure surrounding the backside and edges of the mobile device. A removable phone retainer comprising a section of the case skirt permits the device to be removably inserted into the case without tools, and secures the device to the inner face of the case in union with the male receiving end of the electronic memory adapter. Installation of the mobile device involves removing the retainer, sliding the device into the case, pressing the device into the memory connector, and replacing the retainer. The backside of the case includes a U-shaped slot which contains the folding kickstand. The terminal ends of the slot contain pins upon which the hinged portions of the kickstand rotate. When folded against the case, the kickstand lies flush with the back of the case. The kickstand is retained in the slot by detents or clasps.

When deployed, the kickstand makes an angle to the case and supports the device against a surface. In this orientation the device is positioned in a "landscape" orientation, with the longest length of the device parallel to the supporting surface of the kickstand. This position is ideal for using the stylus to interface with a touch screen device. An alternative method may allow placement of the device in a "portrait" orientation. The stylus is optimized for this purpose and comprises a cylindrical body with a pointed tip for engaging the touch screen. The stylus is storable in the stylus slot, which comprises a slotted trench in the supporting member of the kickstand. The stylus is preferably retained by a magnet and is accessible when the kickstand is deployed from the case. The stylus is removed from the slot by sliding the stylus from either end of the kickstand base.

The memory expansion adapter comprises a pair of terminals contained in the body of the case. A slot in the case provides a receptacle to retain a micro-SD card or similar storage device. The slot is equipped with a removable dust cover. The first terminal is placed on the outward-facing side of the slot, and engages with the electrical contacts of the storage unit. The second terminal is located on the inside face of the case coincident with a port on the mobile device. The internal hardware of the memory expansion adapter is configured to adapt the external storage device with the hardware of the mobile device.

The MemEx case may be offered in various configurations to accommodate the differing commercial phones and devices on the market. The case may also be sold in a variety of colors and aesthetic designs. In some embodiments, the case may include adapters for charging accessories.

Figure 2:
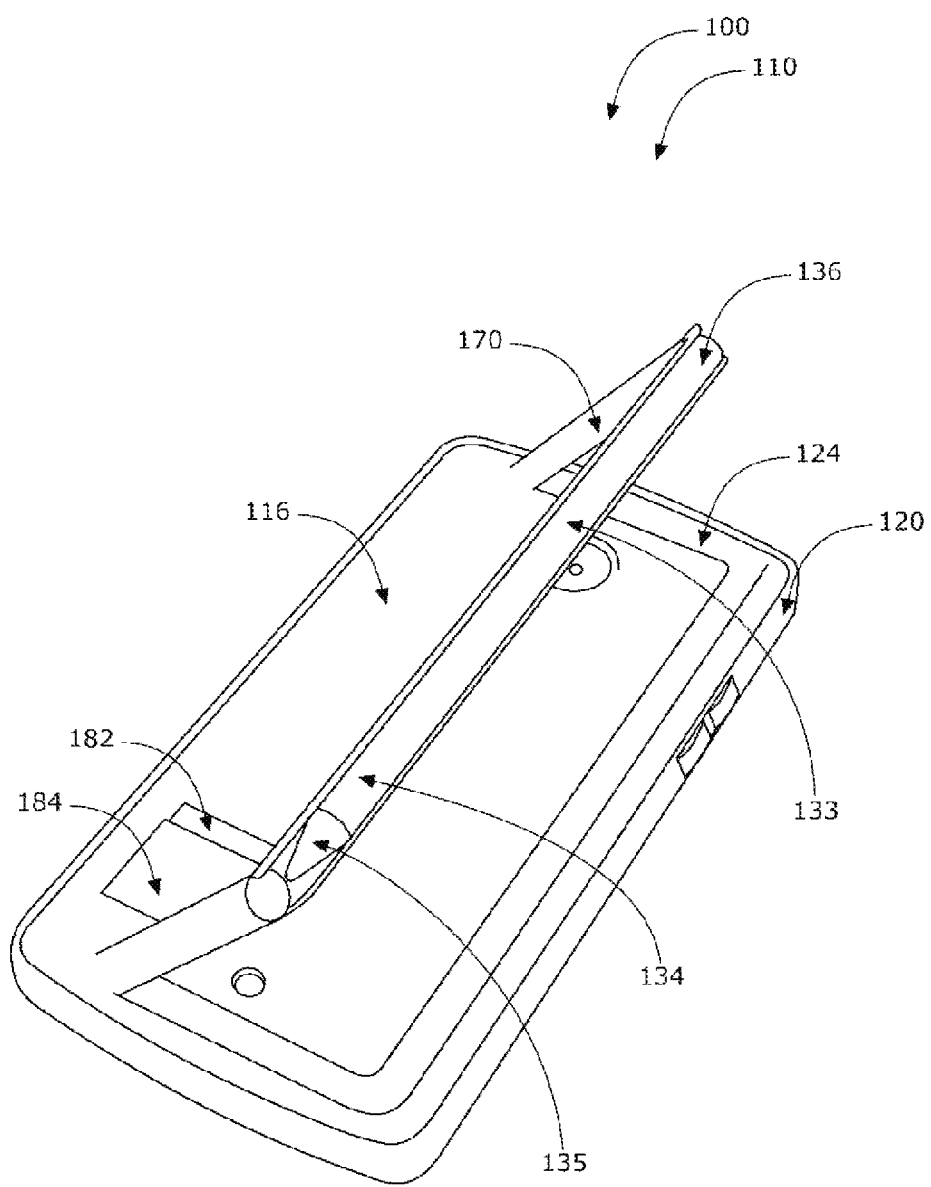
FIG. 2 is a perspective view illustrating the MemEx Cell Phone Case system of FIG. 1, according to an embodiment of the present disclosure.
Figure 3:
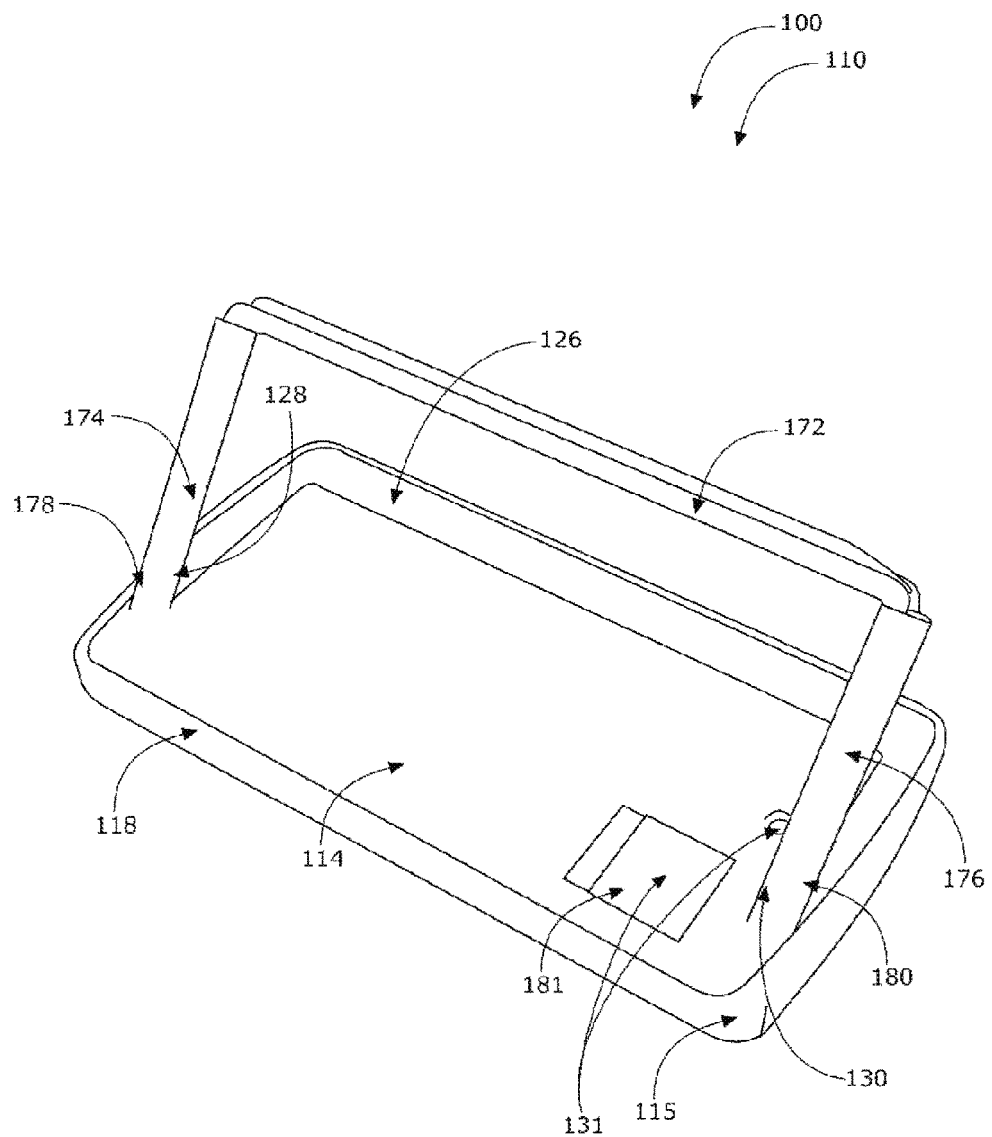
FIG. 3 is a perspective view illustrating the back side of the MemEx Cell Phone Case with the kickstand deployed, according to an embodiment of the present disclosure.
Figure 4:
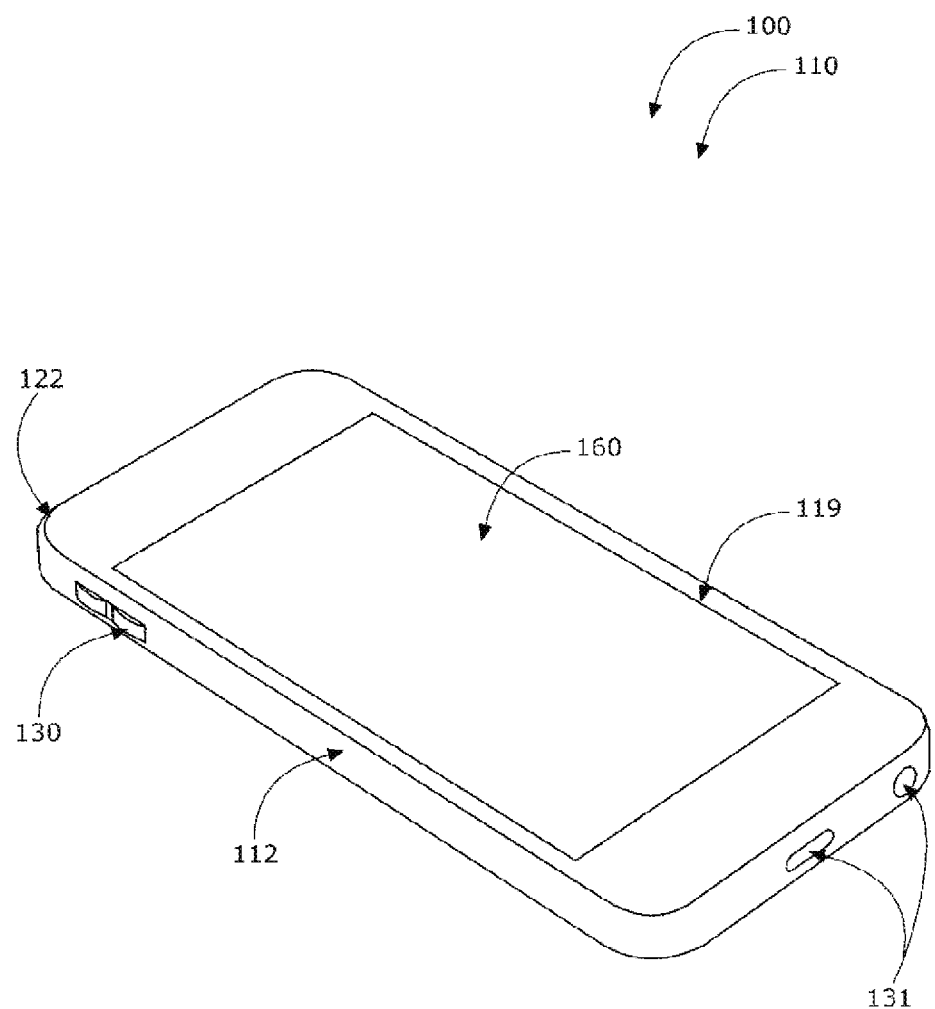
FIG. 4 is a perspective view illustrating the front side of the MemEx Cell Phone Case, according to an embodiment of the present disclosure.

Referring to the drawings by numerals of reference there is shown in FIGS. 1-4, an accessory for mobile devices according to an embodiment of the present disclosure. The mobile device accessory (MemEx Cell Phone Case system 100) may comprise MemEx Cell Phone Case assembly 110, which may comprise case shell 112 including and defined by backside cover panel 114 having inside face 115 and outside face 116, case skirt 118 having inside surface 119 and outside surface 120, detachable phone retainer 122, kickstand receiving slot 126, at least two hinge pins 128, at least two flexible button covers 130, and plurality of apertures 131; stylus 132 including and defined by an elongated cylindrical body 133, proximal end 134 having pointed tip 135, and distal end 136 axially distal to the proximal end 134; kickstand 170 including and defined by surface support 172, stylus well 124 integrated with the surface support 172, said stylus well 124 configured to receive and retain the stylus 132, upper supporting member 174, lower supporting member 176, upper hinge knuckle 178, and lower hinge knuckle 180; memory expansion adapter 181 including and defined by mobile device accepting terminal 182, and external memory accepting terminal 184 that is structured and arranged to interchangeably accept and retain an external memory device, said external memory accepting terminal 184 further structured and arranged to communicate with an internal memory of the mobile device 160.

Case shell 112, stylus 132, kickstand 170, and memory expansion adapter 181 are in functional combination. Stylus 132 is removably retained within case shell 112, and kickstand 170 is hingedly attached to an extendable from case shell 112. Memory expansion adapter 181 is permanently contained within case shell 112. MemEx Cell Phone Case system 100 is structured and arranged to enclose mobile device 160, and to interchangeably accept and retain external memory device 162 within memory expansion adapter 181. Memory expansion adapter 181 is structured and arranged to communicate with internal memory of mobile device 160.

Inside face 115 of backside cover panel 114 of case shell 112, inside surface 119 of case skirt 118 of case shell 112, and detachable phone retainer 122 of case shell 112 in functional combination form inner volume structured and arranged to hold mobile device 160. Plurality of apertures 131 of case shell 112 are structured and arranged to allow access to various controls and functions of mobile device 160. At least two flexible button covers 130 are structured and arranged to allow protective access to various controls of mobile device 160, and stylus 132 is removably attachable to said stylus well 124 of said kickstand 170 for storage. Upper hinge knuckle 178 of kickstand 170 and lower hinge knuckle 180 of kickstand 170 are hingedly attached to at least two hinge pins 128 of case shell 112 within kickstand receiving slot 126 of case shell 112, kickstand 170 being storable within kickstand receiving slot 126 of case shell 112.

Plurality of apertures 131 of case shell 112 is structured and arranged to receive external memory device 162 in communication with memory expansion adapter 181 and mobile device accepting terminal 182 of memory expansion adapter 181 and external memory accepting terminal 184 of memory expansion adapter 181 are integral to backside cover panel 114 of case shell 112. Memory expansion adapter 181 is usable by mobile device 160 through communication of electronic circuitry for storing electronic data when external memory device 162 is attached.

Case shell 112 is constructed of plastic and rubber, and is structured to allow normal signal transmission of said mobile device 160. Kickstand 170 is pivotably attached to backside cover panel 114 of case shell in alignment with kickstand receiving slot 126 of case shell 112 so that kickstand 170 lies flush with backside cover panel 114 of case shell 112; when deployed, surface support 172 of kickstand 170 and outside surface 120 of case skirt 118 of case shell 112 form resting face upon which mobile device 160 is supported.

Stylus 132 is structured and arranged to interface with mobile device 160 by means of touchscreen technologies. Mobile device 160 is chargeable through case shell 112, particularly via USB-type charging terminals.

Outside surface 120 of case skirt 118 of case shell 112, outside face 116 of backside cover panel 114 of case shell 112, and detachable phone retainer 122 of case shell 112 form protective outer membrane enclosing mobile device 160 for preventing damage to mobile device 160.

It should be noted that MemEx Cell Phone Case system 100 may be adapted as a kit 105 comprising the following parts: at least one case shell 112, at least one kickstand 170, at least one stylus 132, at least one memory expansion adapter 181, and at least one set of user instructions 145. The kit 105 has instructions 145 such that functional relationships are detailed in relation to the structure of the disclosure (such that the disclosure can be used, maintained, or the like in a preferred manner). MemEx Cell Phone Case 100 may be manufactured and provided for sale in a wide variety of sizes and shapes for a wide assortment of applications.

A method of using the mobile device accessory 100 described above may include the steps of: providing the mobile device accessory including a case shell, a stylus, a kickstand, and an external memory adapter, pressing a mobile device into said retention lip of said case shell against a backside cover panel of said case shell, uncoupling said stylus from a stylus well of said kickstand, deploying said kickstand from a kickstand receiving slot in said case shell; resting said mobile device on a surface support of said kickstand, and using said stylus to interface with said mobile device. Similarly, a preferred method of using the MemEx Cell Phone Case system 100 includes pressing the mobile device into the retention lip of the case shell against the backside cover panel of the case shell, uncoupling the stylus from the stylus well of the kickstand, deploying the kickstand from the kickstand receiving slot of the case shell, resting the mobile device on the surface support of the kickstand; and using the stylus to interface with the mobile device.

Upon reading this specification, it should be appreciated that, under appropriate circumstances, considering such issues as user preferences, design preference, structural requirements, marketing preferences, cost, available materials, technological advances, etc., other case structure arrangements such as, for example, cases accommodating the unique layouts and features of commercially available mobile devices, etc., may be sufficient.

It should be noted that the steps described in the method of use can be carried out in many different orders according to user preference. The use of "step of" should not be interpreted as "step for", in the claims herein and is not intended to invoke the provisions of 35 U.S.C. §112(f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An accessory for a mobile device, the accessory comprising:
    a case shell including and defined by
        a backside cover panel having an inside face and an outside face,
        a case skirt having an inside surface and an outside surface, the case skirt interfacing with the backside cover panel,
        a detachable phone retainer configured to retain the mobile device in the case shell,
        a kickstand receiving slot in the case shell,
        at least two hinge pins fixed to the case shell,
        at least two flexible button covers fixed to the case shell, and
        a plurality of apertures in the case shell;
    a stylus including and defined by
        an elongated cylindrical body,
        a proximal end having a pointed tip, said pointed tip operable with the mobile device, and
        a distal end axially distal to the proximal end;
    a kickstand including and defined by
        a surface support,
        a stylus well integrated with the surface support, said stylus well configured to receive and retain the stylus,
        an upper supporting member coupled to said surface support,
        a lower supporting member coupled to said surface support,
        an upper hinge knuckle coupled to said upper supporting member, and
        a lower hinge knuckle coupled to said lower supporting member; and
    a memory expansion adapter including and defined by
        a mobile device accepting terminal, and
        an external memory accepting terminal structured and arranged to interchangeably accept and retain an external memory device, said external memory accepting terminal further structured and arranged to communicate with an internal memory of the mobile device;
    wherein said case shell, stylus, kickstand, and memory expansion adapter are in functional combination;
    wherein said stylus is removably retained within said stylus slot of said kickstand;
    wherein said kickstand is hingedly attached and extendable from said case shell;
    wherein said memory expansion adapter is permanently contained within said case shell; and
    wherein said accessory is structured and arranged to enclose the mobile device.

2. The accessory of claim 1, wherein said inside face of said backside cover panel of said case shell, said inside surface of said case skirt of said case shell, and said detachable phone retainer of said case shell in functional combination form an inner volume structured and arranged to hold said mobile device.

3. The accessory of claim 1, wherein said plurality of apertures of said case shell are structured and arranged to allow access to various controls and functions of said mobile device.

4. The accessory of claim 1, wherein said at least two flexible button covers are structures and arranged to protect and allow access to collocated controls of said mobile device.

5. The accessory of claim 1, wherein said stylus is slidably insertable to said stylus well of said kickstand for storage.

6. The accessory of claim 1, wherein said upper hinge knuckle of said kickstand and said lower hinge knuckle of said kickstand are each hingedly coupled to one of said at least two hinge pins of said case shell within said kickstand receiving slot of said case shell.

7. The accessory of claim 1, wherein said kickstand is stowable within said kickstand receiving slot of said case shell, and retained by magnetic properties of said case shell.

8. The accessory of claim 1, wherein said kickstand is configured to pivot away from the kickstand receiving slot in the case shell to an angle between 15 degrees and 75 degrees between the backside cover panel and each of the upper supporting member and the lower supporting member, respectively.

9. The accessory of claim 1, wherein said mobile device accepting terminal of said external memory expansion adapter and external memory accepting terminal of said external memory expansion adapter are integral to said backside cover panel of said case shell.

10. The accessory of claim 1, wherein said external memory expansion adapter is usable by said mobile device through the communication of electronic circuitry for storing electronic data when said external memory device is attached.

11. The accessory of claim 1, wherein said case shell is constructed of plastic and rubber.

12. The accessory of claim 1, wherein said case shell is structured to allow normal signal transmission of said mobile device.

13. The accessory of claim 1, wherein said kickstand is pivotably attached to said backside cover panel of said case shell in alignment with said kickstand receiving slot of said case shell such that said kickstand lies flush with said backside cover panel of said case shell when retained in a stowed state.

14. The accessory of claim 1, wherein said surface support of said kickstand and said outside surface of said case skirt of said case shell form a resting face upon which said mobile device is supported when said kickstand is deployed to a deployed state, in either a portrait or landscape orientation.

15. The accessory of claim 1, wherein said stylus is structured and arranged to interface with said mobile device by means of touchscreen technologies.

16. The accessory of claim 1, wherein said mobile device is chargeable through said case shell via an integrated USB-type charging terminal.

17. The accessory of claim 1, wherein said outside surface of said case skirt of said case shell, said face of said backside cover panel of said case shell, and said detachable phone retainer of said case shell form a substantially rectangular protective outer membrane enclosing said mobile device and configured to protect said mobile device against damage.

18. A mobile device accessory comprising:
   a case shell including and defined by
      a backside cover panel having an inside face and an outside face,
      a case skirt having an inside surface and an outside surface, the case skirt interfacing with the backside cover panel,
      a detachable phone retainer configured to retain the mobile device in the case shell,
      a kickstand receiving slot in the case shell,
      at least two hinge pins fixed to the case shell,
      at least two flexible button covers fixed to the case shell, and
      a plurality of apertures in the case shell;
   a stylus including and defined by
      an elongated cylindrical body,
      a proximal end having a pointed tip, said pointed tip operable with the mobile device, and
      a distal end axially distal to the proximal end;
   a kickstand including and defined by
      a surface support,
      a stylus well integrated with the surface support, said stylus well configured to receive and retain the stylus,
      an upper supporting member coupled to said surface support,
      a lower supporting member coupled to said surface support,
      an upper hinge knuckle coupled to said upper supporting member, and
      a lower hinge knuckle coupled to said lower supporting member; and
   a memory expansion adapter including and defined by
      a mobile device accepting terminal, and
      an external memory accepting terminal structured and arranged to interchangeably accept and retain an external memory device, said external memory accepting terminal further structured and arranged to communicate with an internal memory of the mobile device;
   wherein said case shell, stylus, kickstand, and memory expansion adapter are in functional combination;
   wherein said stylus is removably retained within said stylus slot of said kickstand;
   wherein said kickstand is hingedly attached and extendable from said case shell;
   wherein said memory expansion adapter is permanently contained within said case shell;
   wherein said accessory is structured and arranged to enclose the mobile device;
   wherein said inside face of said backside cover panel of said case shell, said inside surface of said case skirt of said case shell, and said retention lip of said case shell in functional combination form an inner volume structured and arranged to hold said mobile device;
   wherein said plurality of apertures of said case shell are structured and arranged to allow access to various controls and functions of said mobile device;
   wherein said at least two flexible button covers are structures and arranged to protect and allow access to collocated controls of said mobile device;
   wherein said stylus is removably attachable to said stylus well of said kickstand for storage;
   wherein said upper hinge knuckle of said kickstand and said lower hinge knuckle of said kickstand are each hingedly coupled to one of said at least two hinge pins of said case shell within said kickstand receiving slot of said case shell;
   wherein said kickstand is stowable within said kickstand receiving slot of said case shell and retained by magnetic properties of said case shell;
   wherein said kickstand is configured to pivot away from the kickstand receiving slot in the case shell to an angle between 15 degrees and 75 degrees between the backside cover panel and each of the upper supporting member and the lower supporting member, respectively;
   wherein said mobile device accepting terminal of said external memory expansion adapter and external memory accepting terminal of said external memory expansion adapter are integral to said backside cover panel of said case shell;
   wherein said external memory expansion adapter is usable by said mobile device through the communication of electronic circuitry for storing electronic data when said external memory device is attached;
   wherein said case shell is constructed of plastic and rubber;
   wherein said case shell is structured to allow normal signal transmission of said mobile device;
   wherein said kickstand is pivotably attached to said backside cover panel of said case shell in alignment with said kickstand receiving slot of said case shell such that said kickstand lies flush with said backside cover panel of said case shell when retained in a stowed state;
   wherein said surface support of said kickstand and said outside surface of said case skirt of said case shell form a resting face upon which said mobile device is supported when said kickstand is deployed to a deployed state;
   wherein said stylus is structured and arranged to interface with said mobile device by means of touchscreen technologies;
   wherein said mobile device is chargeable through said case shell via a USB-type charging terminal; and
   wherein said outside surface of said case skirt of said case shell, said face of said backside cover panel of said case shell, and said retention lip of said case shell form a substantially rectangular protective outer membrane enclosing said mobile device and configured to protect said mobile device against damage.

19. The mobile device accessory of claim 18, further comprising a set of user instructions;
   wherein the mobile device accessory is configured as a kit.

* * * * *